United States Patent
Klaes

(10) Patent No.: US 7,582,319 B2
(45) Date of Patent: Sep. 1, 2009

(54) PRODUCTION OF A SHELL-LIKE FORMED CONSUMABLE ITEM FROM A FAT-CONTAINING MASS

(75) Inventor: Dirk Klaes, Bergneustadt (DE)

(73) Assignee: Buehler Bindler GmbH, Bergneustadt (DE)

( * ) Notice: Subject to any disclaimer, the term of this patent is extended or adjusted under 35 U.S.C. 154(b) by 705 days.

(21) Appl. No.: 10/474,924

(22) PCT Filed: Mar. 6, 2002

(86) PCT No.: PCT/DE02/00806

§ 371 (c)(1),
(2), (4) Date: Dec. 17, 2003

(87) PCT Pub. No.: WO02/089595

PCT Pub. Date: Nov. 14, 2002

(65) Prior Publication Data

US 2004/0137113 A1 Jul. 15, 2004

(30) Foreign Application Priority Data

May 9, 2001 (DE) ............................... 101 22 548

(51) Int. Cl.
*A23G 1/021* (2006.01)
(52) U.S. Cl. ................. 426/245; 426/237; 426/512; 426/514; 426/515; 426/238; 426/247; 426/524; 425/412; 425/416; 425/424
(58) Field of Classification Search ......... 426/512–515; 425/412, 416
See application file for complete search history.

(56) References Cited

U.S. PATENT DOCUMENTS 3,447,587 A * 6/1969 Bodine, Jr. .................. 164/501

(Continued)

FOREIGN PATENT DOCUMENTS

DE  11 13 865  9/1961

(Continued)

OTHER PUBLICATIONS http://www.hukseflux.com/thermal%20conductivity/thermal.htm, Dec. 20, 2007.*

(Continued)

*Primary Examiner*—Drew E Becker
*Assistant Examiner*—Steven Leff
(74) *Attorney, Agent, or Firm*—Jordan and Hamburg LLP

(57) ABSTRACT

The invention relates to a method for the production of a shell-like formed consumable item from a fatty mass, more particularly a fatty mass containing cocoa or chocolate, wherein a cell is initially filled with the fatty mass in flowable temperature state in a dosed manner in a mold, whereupon a cooling body with a temperature below melting temperature of the tempered fatty mass is dipped into the liquid fatty mass so that the flowable fatty mass can be distributed in the intermediate space defined by the cell and the cooling body. The cooling body is maintained in dipped position inside the fatty mass for a given space of time until the fatty mass located in the intermediate space hardens. According to the invention, the flowable tempered fatty mass is vibrated for a given space of time after filling the cell and before dipping the cooling body.

23 Claims, 2 Drawing Sheets

U.S. PATENT DOCUMENTS

| | | | | | |
|---|---|---|---|---|---|
| 3,666,388 | A | * | 5/1972 | Oberwelland | 425/261 |
| 3,798,337 | A | * | 3/1974 | Abalo | 426/279 |
| 4,421,773 | A | * | 12/1983 | Akutagawa | 426/249 |
| 4,478,858 | A | * | 10/1984 | Baird et al. | 426/126 |
| 5,034,240 | A | * | 7/1991 | Tanaka et al. | 426/607 |
| 5,409,722 | A | * | 4/1995 | Binley | 426/515 |
| 5,492,708 | A | * | 2/1996 | Hemmerich | 426/499 |
| 5,635,230 | A | * | 6/1997 | Aasted | 426/138 |
| 5,705,217 | A | * | 1/1998 | Aasted | 426/512 |
| 5,795,613 | A | * | 8/1998 | Scharfmann et al. | 426/582 |
| 6,135,016 | A | | 10/2000 | Bindler | |
| 6,268,006 | B1 | | 7/2001 | Knobel | |
| 6,497,568 | B1 | | 12/2002 | Aasted | |
| 6,641,386 | B2 | * | 11/2003 | Aasted | 425/547 |

FOREIGN PATENT DOCUMENTS

| | | |
|---|---|---|
| DE | 11 45 467 | 3/1963 |
| DE | 37 34 626 | 10/1988 |
| DE | 4241610 | 6/1994 |
| DK | 0914774 * | 5/1999 |
| DK | 0914775 * | 5/1999 |
| EP | 0 589 820 | 3/1994 |
| JP | 05030912 A * | 2/1993 |
| WO | 98/52425 | 11/1998 |
| WO | WO-98/52425 | 11/1998 |
| WO | 99/34685 | 7/1999 |

OTHER PUBLICATIONS

Letter of "Gebrueder Bindler Maschinenfabrik GmbH & Co. KG", Berneustadt dated Apr. 7, 2000.

Objection/Appeal of Buehler GmbH Against DE 10 2005 018 417 dated Jun. 29, 2007.

Drawing of a cold stamp block/cold punching tool ("Kaltstempelblock") by "Gebrueder Bindler Maschinenfabrik GmbH & Co. KG", Berneustadt.

Journal "Fats, Soaps, Coating Composition", pp. 721-729, dated 1961.

Journal "Confectionaries" Official Publication of the Association of the German Confectionery Industry, Sep. 1995.

* cited by examiner

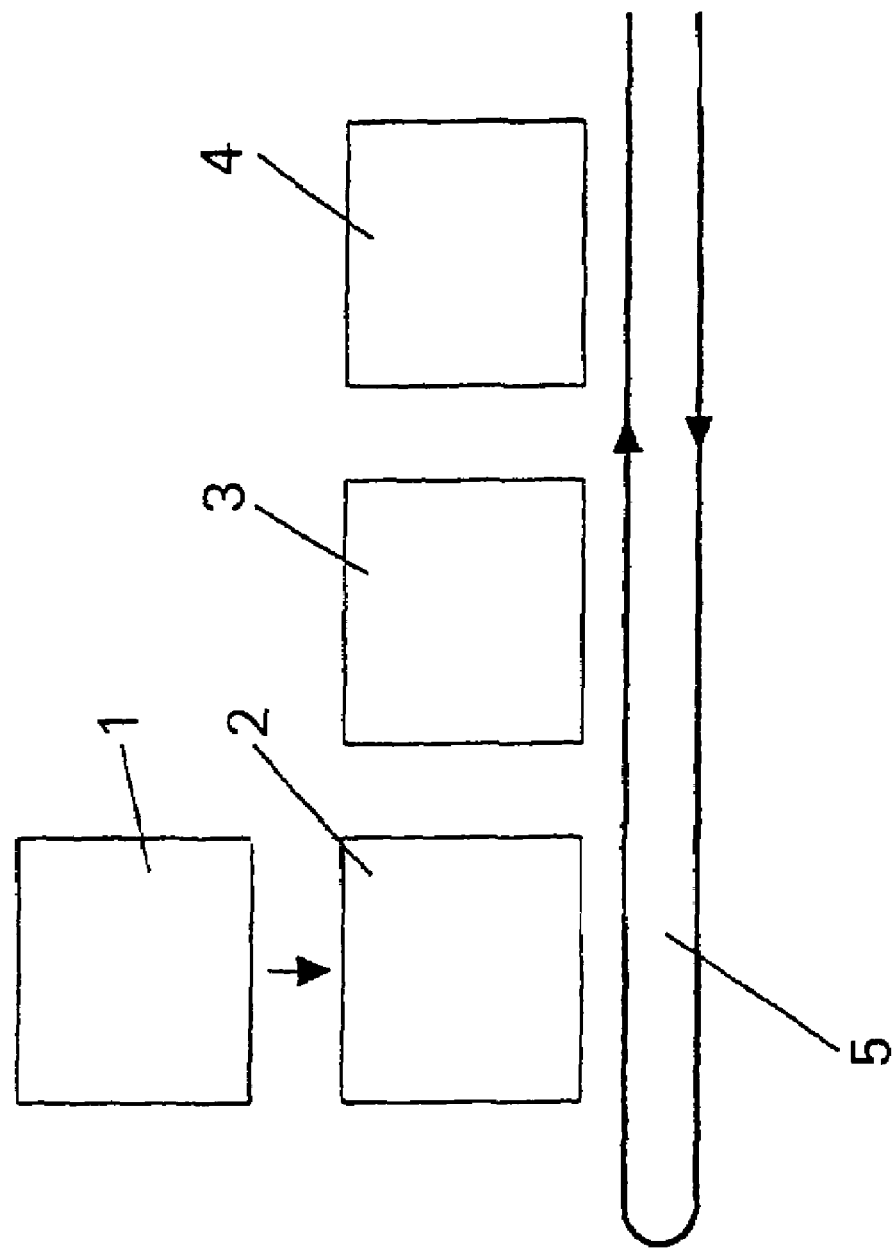

PRODUCTION OF A SHELL-LIKE FORMED CONSUMABLE ITEM FROM A FAT-CONTAINING MASS

BACKGROUND OF THE INVENTION

The invention relates to a process and a device for producing a shell-like consumable goods from mass containing fat, in particular a bulk fat containing cocoa or chocolate.

Processes and devices for producing shell-like chocolate articles are already known. For example, EP 0 589 820 B1 discloses a process and a device for producing outer shells from masses containing fat, and similar to chocolate, in particular for chocolate articles. At the same time an alveola (a moulded cavity) is filled with tempered chocolate-like mass, which hardens inwards from the aveola out with crystallisation for developing the outer shape of the shell, whereby the alveola has a lower temperature than that of the tempered mass. Immediately after the mass is poured into the alveola a cooling body with a temperature below 0° C. is lowered into the mass and kept in this fully immersed position for a preset period in the mass, so that a preset shell volume between the cooling body and the alveola is specified.

With this particular method of operation there is, however, no guarantee that the mass containing fat filling the alveola is free from air pockets. Such air pockets can be present e.g. in the case of tempered chocolate mass in more or less large and more or less evenly distributed air bubbles in the melted bulk fat. They can e.g. already be contained in the tempered chocolate mass in the storage vessel before filling of the alveola or originate from the environmental air when the alveolae are being filled with chocolate mass.

WO 98/52425 describes a process and a device for producing shell-like chocolate articles.

U.S. Pat. No. 6,135,016 also describes a plant for producing chocolate articles with a vibration section for vibrating shells filled with liquid chocolate.

Furthermore, according to the nature of the mass containing fat to be treated it can also eventuate that the alveola filled with mass is not evenly distributed in the alveola.

Both air pockets in the mass containing fat and uneven distribution of the mass in the alveola can result impairing of the mass in the alveola can result impairing the quality of the shell-like consumable goods formed after the cooling body is lowered into the liquid mass, such as e.g. uneven shell thickness including holes in the shell, uneven shell edge, etc.

SUMMARY OF THE INVENTION

The object of the invention is therefore to provide a process and a corresponding device for producing a shell-like consumable goods from a fatty mass, in particular a bulk fat containing cocoa or chocolate, wherein the shortcomings mentioned at the outset are by and large avoided.

This task is achieved according to the present invention in the initially described process of the prior art, after the alveola is filled and before the cooling body is immersed, by the flowable tempered bulk fat being treated for a specific duration of vibration in vibration, characterised in that the exciting vibration frequency has approximately the same value as a resonance frequency of the liquid mass in the alveola.

This task is solved in terms of equipment by in a device of the state of the art vibration means being provided, with which the mass containing fat can be treated in vibration, characterized in that the vibration means can be operated with variable frequency.

Due to the process according to the present invention even before the cooling body is lowered, i.e. before the actual step of cold stamping, the mass is distributed as evenly as possible in the alveola. And at least extensive ventilation of the mass takes place before the actual crystallisation and moulding step.

Vibration of the flowable tempered bulk fat in the alveolae of the mould is preferably generated by vibrating the mold, which then imparts its vibration completely to the substance contained therein. As an alternative or by way of addition, the free-flowing, heated fatty substance can also be made to vibrate in the alveoli by vibrating the air over the alveoli, which then conveys the vibration to the substance in the alveolus via the air.

Depending on the consistency of the substance to be processed, it may be advantageous to have vibration take place during the period of vibration at a frequency that progresses from a minimum frequency at the start of the vibration period to a maximum frequency at the end of the vibration period, or have vibration take place during the period of vibration at a frequency that progresses from a maximum frequency at the start of the vibration period to a minimum frequency at the end of the vibration period. On the other hand, it can also be advantageous to have vibration take place during the period of vibration independently thereof at an amplitude that progresses from a maximum amplitude at the start of the vibration period to a minimum amplitude at the end of the vibration period, or have vibration take place during the period of vibration at an amplitude that progresses from a minimum amplitude at the start of the vibration period to a maximum amplitude at the end of the vibration period.

These measures make it possible to take into account the type of air pockets, e.g., large or small, air bubbles present mainly on the floor of the mold or the surface of the substance, which enables a more efficient smoothing out of the substance and its more efficient evacuation.

In another possible variant of the procedure according to the invention, the exciting vibration frequency has roughly the same value as a resonance frequency of the fluid substance in the alveolus, wherein the exciting vibration frequency preferably passes through several frequency ranges in which a resonance frequency of the fluid substance in the alveolus lies. It is best to allow the exciting vibration frequency to remain at least at one of the resonance frequencies of the fluid substance during its frequency progression for a period measuring a fraction of the overall vibration period.

As an alternative or by way of addition, the exciting vibration frequency can have roughly the same value as a resonance frequency of the alveolus, wherein the exciting vibration frequency can here as well in particular be made to pass through several frequency ranges, in which a resonance frequency of the alveolus lies. During its progression through the frequencies, the exciting vibration frequency is here also best allowed to stay at least at one of the resonance frequencies of the alveolus for a duration representing a fraction of the overall vibration period.

Working with resonance frequencies (natural frequencies) of the mold containing the fluid substance and/or the alveolus or alveoli enables a considerable infusion of mechanical oscillation energy into the fluid substance to be processed, wherein various resonance frequencies of the substance and/or the alveolus can be used in a targeted fashion to "drive out" air blisters or air bubbles of varying size. In particular, various frequencies, in particular resonance frequencies, can be simultaneously used for excitation purposes, wherein the one frequency is introduced into the substance via the air, and the other frequency via the alveolus.

In another preferred variant, the alveolus and cooling element are each rotationally symmetric along a shared axis of symmetry. After the alveolus has been filled and before the cooling element is submerged, each alveolus and the heated, free-flowing fatty substance therein can be made to rotate around the axis of symmetry for a specific period of rotation.

Since the alveolus is filled only slightly with fluid substance before the cooling element is submerged, the free-flowing substance forms a paraboloidal surface during exposure to the centrifugal and gravitational forces inside the alveolus, which is considerably larger than the flat surface of the substance without rotation. This facilitates the evacuation of the fluid substance, primarily owing to the fact that the air bubbles only still have a distinctly shorter path to the surface on the one hand, and that a stronger field of force prevails inside the paraboloidally arranged fluid substance on the other hand, so that the air bubbles are driven out of the substance much faster than without rotation along the lines of force that are curved inside the substance and run perpendicular to the surface of the substance at a constant viscosity of the substance. Use is here made of the fact that the lines of force of the substance forces (gravitational force+centrifugal force) are curved at all locations of the surface perpendicular to the surface and inside the fluid substance, but still run approximately perpendicular to the surface over wide areas in the fluid substance after the paraboloidal equilibrium surface caused by the rotation and gravitation has been reached. At the same time and also advantageously, however, the substance is already pre-distributed to approximate the desired shell form while preparing for the subsequent cold-stamping and crystallization step. This is expedient and desired, since, during the expulsion process and formation of the fluid substance during the actual cold-stamping step, the greater part of the substance contained in the mold only has to traverse shorter paths while flowing into the final mold, which as a whole results in an improved "uniform treatment" of all parts of the substance during cooling, flowing and crystallizing.

In another variant, the alveolus and cooling element are also each rotationally symmetric along a shared axis of symmetry, and, after the alveolus has been filled and before the cooling element is submerged, a stream of air rotationally symmetric relative to the axis of symmetry shared by the alveolus and cooling element is injected into the alveolus via the free-flowing, heated fatty substance contained therein over a specific injection period. Similarly to rotation, this increases the surface, and yields a distribution of the fluid substance approximating the final shell shape, with similar advantages.

The air enveloping the cooling element in the procedure is best continuously dehumidified to prevent the condensation of water vapor on the cooling element. The air enveloping the cooling element in the procedure can additionally be continuously cooled.

The air used for rotationally symmetric injection into the alveolus preferably has the same temperature as the fluid, heated substance in the alveolus. This prevents the surface of the fluid substance from cooling, and crystallization from setting in prematurely before the cooling element is submerged. This also facilitates a "uniform treatment" of all areas of the fluid substance during the cold-stamping step, and hence more uniform products.

The air used in the alveolus for rotationally symmetric insertion is also best continuously dehumidified to minimize the penetration of water into the fluid substance.

It is particularly advantageous for the dew point of the air to always be kept under the surface temperature of the cooling element. As a result, the cooling element always remains dry, and retains its surface that defines the inner shell surface, thereby preventing adulteration of the inner shell surface. Hygiene is also improved, since bacterial growth is inhibited on a cool and dry surface.

The surface of the cooling element is ideally kept at a temperature of less than −10° C.

In a particularly preferred variant of the device according to the invention, the vibrating means is suitably coupled with the alveolus in such a way that the vibrations can be conveyed to the mold (structure-borne noise principle).

In another preferred variant, the vibrating means is suitably coupled with the air over the alveolus in such a way that the vibrations can be conveyed to the air (airborne sound principle).

The vibrating means is best operated at a variable frequency and/or variable amplitude.

In another preferred variant, the mold and cooling element are each rotationally symmetric along a shared axis of symmetry, and the alveolus can be rotated around the axis of symmetry.

In another preferred variant, the alveolus and cooling element are also each rotationally symmetric along a shared axis of symmetry, with a pressure source being provided that can inject a stream of air rotationally symmetric relative to the axis of symmetry shared by the alveolus and cooling element into the alveolus, wherein the device best has an air dehumidifier and/or air heater.

It is particularly advantageous for the cooling element to have a thermal conductivity of over 200 W/mK. This enables a rapid cooling of the fat-containing substance with especially fine crystals.

Additional advantages, features and possible applications of the invention are described in the following description with reference to the accompanying drawings:

BRIEF DESCRIPTION OF THE DRAWINGS

FIG. 1 shows a flowchart for the procedure according to the invention, providing a diagrammatic view of the device according to the invention.

DESCRIPTION OF THE PREFERRED EMBODIMENTS

Figure 2A:
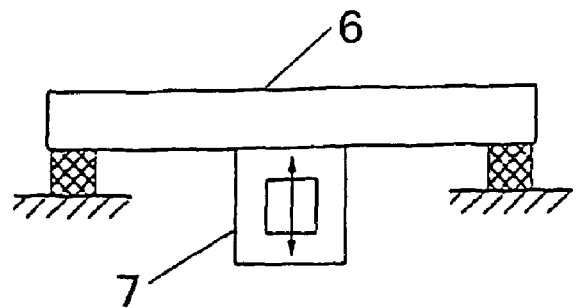
FIGS. 2A, 2B, 2C show of examples of several shakers or vibrators in diagrammatic form.

FIG. 1 shows a diagrammatic view of the essential elements or procedural steps for a cold-stamping system according to the invention for manufacturing shells or sleeves out of a fat-containing chocolate substance. The system consists of a heating station 1, a metering station 2, a shaking station 3 and a cold-stamping station 4. In addition, it contains a transporting device 5 for transporting molds to be filled with fluid chocolate substance (not shown), in which numerous alveoli (concave recesses) are formed.

The fat-containing chocolate substance is heated in a temperature range of approx. 28 to 34° C. at the heating station 1. Stable triglyceride crystals of cocoa butter lie within this temperature range. They are used as crystal nuclei during the subsequent cooling and solidification of the chocolate substance. The heated chocolate substance is routed in metered quantities via the metering station 2 to the molds to be filled, which were transported in by the transporting device 5.

The molds whose alveoli have been filled with fluid chocolate substance are then transported on by the transporting device 5 to the shaking station 3, in which the alveoli or molds filled with the chocolate substance are vibrated for a specific time to bring about a uniform distribution of the still fluid chocolate substance in the alveoli and evacuate the fluid chocolate substance. As soon as the shaking or vibrating step has been completed at the shaking station 3, the alveoli filled with the still fluid chocolate substance are transported on by the transporting device 5 to the cold-stamping station 4.

At the cold-stamping station 4, an intensely cooled stamp made out of a readily thermally conductive material is submerged in the alveoli filled with fluid chocolate substance at a temperature of below −10°, into the still fluid chocolate substance containing triglyceride crystal nuclei, which then becomes distributed in the shell-shaped mold defined by the alveolus and cold stamp submerged into the alveolus, and shortly thereafter solidifies into the desired chocolate sleeve, whereupon the stamp is again lifted, and the solidified chocolate shells are removed from the alveoli.

Figure 2B:
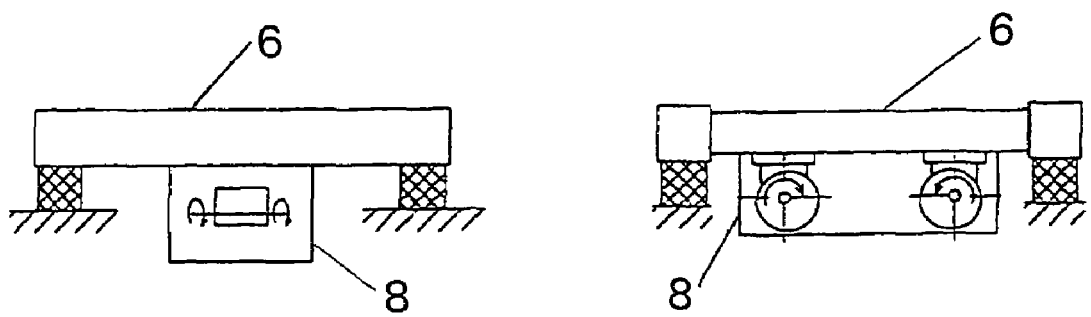
Figure 2C:
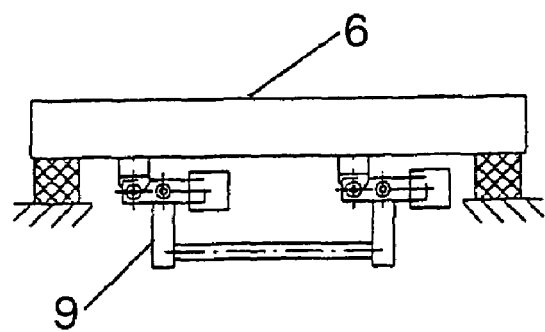

FIGS. 2A, 2B, 2C show examples of several devices that can be used at the shaking station 3 to vibrate the alveoli of a mold filled with metered quantities of fluid chocolate substance. The actual shaker or vibrator 7, 8, 9 is rigidly connected with the support 6 on which the molds to be vibrated with the alveoli are deposited in these variants. However, the shaker or vibrator 7, 8, 9 can be secured to any desired location of a rigid frame of the shaking station 3. Examples of shakers or vibrators include a magnetic vibrator 7 (FIG. 2A), an unbalanced mass shaker 8 (FIG. 2B) or a piston shaker 9 (FIG. 2C).

The invention claimed is:

1. A process for producing shell-shaped consumable goods from a bulk fat substance containing cocoa or chocolate, comprising the following steps:
   metered quantity filling of an alveolus of a mold with the bulk fat substance, said alveolus determining an outer surface of the shell-shaped consumable goods and said bulk fat substance being in a flowable tempered state, wherein the temperature of the mold is below the temperature of the bulk fat substance;
   dipping a cooling body determining an inner surface of the consumable goods into the bulk fat substance, wherein a temperature of the cooling body is below a melting temperature of the bulk fat substance, so that the bulk fat substance is distributed in the space between the mold and the cooling body;
   maintaining the cooling body dipped in the bulk fat substance until the bulk fat substance in the space between the mold and the cooling body has solidified;
   wherein after the alveolus is filled and before the cooling body is dipped into the bulk fat substance, the bulk fat substance is vibrated for a vibration time, wherein the vibration is conveyed either directly to the mold or to the air over the alveolus of the mold via a vibration device, the vibration device being operated at a variable frequency, a variable amplitude, or a variable frequency and a variable amplitude, wherein the vibration frequency is varied during the vibration time either
      from a minimal frequency at the commencement of the vibration time to a maximum frequency at the end of the vibration time, or
      from a maximum frequency at the commencement of the vibration time to a minimum frequency at the end of the vibration time, and further wherein
   at least during a portion of said duration of time a vibration frequency of said bulk fat substance has approximately the same value as a resonance frequency of said bulk fat substance, and
   air surrounding the cooling body is constantly dehumidified.

2. The process of claim 1, wherein the vibration during the duration of time of the vibration develops from maximum vibration amplitude at the commencement of the duration of time of the vibration into minimal amplitude at the end of the duration of time of the vibration.

3. The process of claim 1, wherein the vibration during the duration of time of the vibration develops from minimal amplitude at the commencement of the duration of time of the vibration into maximal amplitude at the end of the duration of time of the vibration.

4. The process of claim 1, wherein the vibration frequency passes through several frequency ranges which correspond to resonance frequencies of the bulk fat substance.

5. The process as claimed in claim 4, wherein the vibration frequency dwells on at least one of the resonance frequencies of the bulk fat substance for a fraction of the duration of time of the vibration.

6. The process of claim 1, wherein the vibration frequency has approximately a same value as a resonance frequency of the mold.

7. The process of claim 1, wherein the vibration frequency passes through several frequency ranges which correspond to resonance frequencies of the mold.

8. The process as claimed in claim 7, wherein the vibration frequency dwells on at least one of the resonance frequencies of the mold for a fraction of the duration of time of the vibration.

9. The process of claim 1, wherein the alveolus and the cooling body are rotationally symmetrical along a common axis of symmetry and after the alveolus is filled and before the cooling body is immersed the alveolus and the bulk fat substance contained therein are set in rotation about the common axis of symmetry during a specific rotation period.

10. The process of claim 1, wherein the alveolus and the cooling body are rotationally symmetrical along a common axis of symmetry and after the alveolus is filled and before the cooling body is immersed, an air current rotationally symmetrical with respect to the common axis of symmetry of the alveolus and the cooling body is blown into the alveolus over the bulk fat substance contained therein over a specific insufflation period.

11. The process of claim 1, wherein air surrounding the cooling body in the process is constantly cooled.

12. The process as claimed in claim 10, wherein the air to be blown rotationally symmetrically into the alveolus has approximately a same temperature as the bulk fat substance in the alveolus.

13. The process as claimed in claim 10, wherein the air to be blown rotationally symmetrically into the alveolus is constantly dehumidified.

14. The process as claimed in claim 9, wherein a dew point of the air surrounding the cooling body is kept below a surface temperature of the cooling body.

15. The process of claim 1, wherein a surface of the cooling body is kept at a temperature of less than −10° C.

16. The process according to claim 1, further comprising heating said bulk fat substance to a temperature range of about 28 to 34° C., said bulk fat substance comprising triglyceride crystals of cocoa butter which are stable at said temperature range.

17. The process of claim 1, wherein the vibration frequency has approximately a same value as a resonance frequency of the bulk fat substance.

18. A device for producing shell-shaped consumable goods from a bulk fat substance containing cocoa or chocolate, wherein the device comprises:

a mold comprising an alveolus, wherein an inner surface of said mold determines an outer surface of the shell-shaped consumable goods to be produced;

an apparatus for metered amount filling of the alveolus with the bulk fat substance in a flowable tempered state;

a cooling body to be immersed into the bulk fat substance, whose outer surface determines the inner surface of the shell-shaped consumable goods to be produced;

a lowering apparatus for dipping the cooling body into the bulk fat substance in the alveolus;

a vibration apparatus with which the bulk fat substance can be treated with vibration for a vibration time; and an air dehumidifier, wherein the vibration apparatus is configured to operate with variable vibration frequency, wherein the vibration frequency is variable either from a minimal vibration frequency at the commencement of the vibration time to a maximum vibration frequency at the end of the vibration time, or from a maximum vibration frequency at the commencement of the vibration time to a minimal vibration frequency at the end of the vibration time, such that vibrations can be conveyed to the bulk fat substance, and said vibration apparatus is configured to operate with variable amplitude.

19. The device of claim 18, wherein the alveolus and the cooling body are rotationally symmetrical along a common axis of symmetry and the device comprises a rotating apparatus to rotate the alveolus about the common axis of symmetry.

20. The device as claimed in claim 19, wherein the rotating apparatus comprises a driven toothed belt for the rotating of the alveolus.

21. The device of claim 18, wherein the alveolus and the cooling body are rotationally symmetrical along a common axis of symmetry and wherein a compressed air source is provided, said air source configured for insufflating into the alveolus an air current rotationally symmetrical with respect to the common axis of symmetry of the alveolus and the cooling body.

22. The device as claimed in claim 21 further comprising an air heater for heating the rotationally symmetrical air current.

23. The device of claim 18, wherein the cooling body has a thermal conductivity of more than 200 W/mK.

* * * * *